United States Patent
Vivyan et al.

(10) Patent No.: US 8,181,303 B2
(45) Date of Patent: May 22, 2012

(54) ROTARY CAR WASH BRUSH AND METHOD OF ASSEMBLY

(75) Inventors: Mark D. Vivyan, Farmington Hills, MI (US); Jerry A. Kotrych, Livonia, MI (US); Barry S. Turner, Novi, MI (US)

(73) Assignee: Belanger, Inc., Northville, MI (US)

( * ) Notice: Subject to any disclaimer, the term of this patent is extended or adjusted under 35 U.S.C. 154(b) by 1083 days.

(21) Appl. No.: 12/098,021

(22) Filed: Apr. 4, 2008

(65) Prior Publication Data
US 2009/0250993 A1  Oct. 8, 2009

(51) Int. Cl.
*B60S 3/06* (2006.01)
(52) U.S. Cl. .................. 15/97.3; 15/230.14; 15/230.16
(58) Field of Classification Search .................. 15/53.2, 15/97.3, 230.14, 230.16
See application file for complete search history.

(56) References Cited

U.S. PATENT DOCUMENTS

| | | | | |
|---|---|---|---|---|
| 3,755,847 | A * | 9/1973 | Liebscher | 15/179 |
| 3,846,861 | A * | 11/1974 | Smith, Sr. | 15/179 |
| 4,018,014 | A | 4/1977 | Belanger | |
| 4,375,116 | A | 3/1983 | Hora | |
| 4,597,127 | A | 7/1986 | Swanson | |
| 6,035,482 | A * | 3/2000 | Belanger et al. | 15/230.14 |
| 7,219,385 | B1 * | 5/2007 | Rietsch, Jr. | 15/97.3 |
| 7,347,771 | B2 * | 3/2008 | Wentworth et al. | 451/466 |
| 2004/0200024 | A1 * | 10/2004 | Yamin | 15/230.16 |
| 2006/0064835 | A1 * | 3/2006 | Favagrossa | 15/230.16 |
| 2009/0205148 | A1 * | 8/2009 | Wentworth | 15/53.2 |
| 2009/0205150 | A1 * | 8/2009 | Wentworth et al. | 15/97.3 |

* cited by examiner

*Primary Examiner* — Randall Chin
(74) *Attorney, Agent, or Firm* — Young Basile Hanlon & MacFarlane PC

(57) ABSTRACT

A car wash brush is constructed by sliding multi-layered, wheel-shaped foam plastic cartridges onto a hub with three keyways formed in the outer surfaces thereof. The cartridges use spacers interspersed with foam layers and adhesively bonded to the foam layers. The spacers have keys which fit into die hub keyways to prevent relative rotation while allowing, longitudinal sliding motion. Multiple cartridges are used to produce a brush of desired length. Old style hubs can be salvaged for use in this construction.

6 Claims, 3 Drawing Sheets

ROTARY CAR WASH BRUSH AND METHOD OF ASSEMBLY

FIELD OF THE INVENTION

This invention relates to a rotary car wash brush for washing a vehicle in an automatic or semi-automatic car wash and, more particularly, to a brush which is easily and rapidly constructed and/or reconstructed.

BACKGROUND OF THE INVENTION

Known car wash brushes include an elongated tubular hub with a plurality of circumferentially spaced, longitudinal grooves formed in the outer surface. U.S. Pat. No. 4,018,014 assigned to Belanger, Inc. discloses such a hub. The grooves are designed to receive and hold packs of elongated brush elements; i.e., long strips of felt or other fabric tied together by a clip. Each clip is designed to be inserted into a respective longitudinal groove, forming a tongue-and-groove type connection between the clip and hub. Thus, the brush elements are slidably engaged with the hub and, due to the cylindrical shape of the grooves and clips, have some freedom to rotate relative to the hub. While the brush functions well, building it by sliding the brush elements into the grooves is a time-consuming process.

SUMMARY OF THE INVENTION

The present invention provides a rotary car wash brush with a hub and brush cartridges mounted on the hub in such a way as to make brush construction and reconstruction much easier. In general, the brush includes a hub having an outer surface with one or more longitudinal keyways formed therein. The brush cartridges take the form of fully prefabricated wheels with center structures made of plastic with one or more keys which fit into the keyways in the hub such that multiple cartridges can be slid onto the hub until the stack makes up a brush of the desired overall length. The center structures serve not only as mounts but also as spacers to maintain the proper spacing between the branch cartridges with their radially extending fabric fingers. The term "fabric" is used here in a broad sense, but with the understanding that the preferred material is a flexible, medium density foam plastic.

In the preferred form, a rotary car wash brush cartridge for slidable engagement with a hub having an outer radial surface defining a guide or keyway includes a plurality of annular brush elements made of a first foam plastic. A plurality of annular spacers made of a second foam plastic are also included, and the brush elements and spacers are assembled in alternating fashion. At least one of the plurality of brush elements and the plurality of spacers defines an aperture with one or more inward projections keyed to the hub. As hereinafter explained, the invention allows the use of conventional prior art hubs as defined above, requiring only the addition of one or more longitudinal keyways to accept the new brush cartridges. Because the hub is an expensive component, salvaging the old hub can save the operator money when converting to the new style brush described herein.

According to another aspect of the invention, a method of constructing a car wash brush of the type comprising an elongate cylindrical hub having one or more longitudinal keyways formed therein and a plurality of prefabricated brush cartridges, each of which has a central aperture with at least one inwardly projecting cartridge key and multiple layers of brush elements interspersed with at least one annular spacer, is provided. The method includes sliding one or more of the cartridges onto the hub with the cartridge key fitting into the keyway for non-rotatable engagement between the hub and the cartridges until a brush of desired length is created.

DETAILED DESCRIPTION OF THE ILLUSTRATIVE EMBODIMENTS

Figure 1:
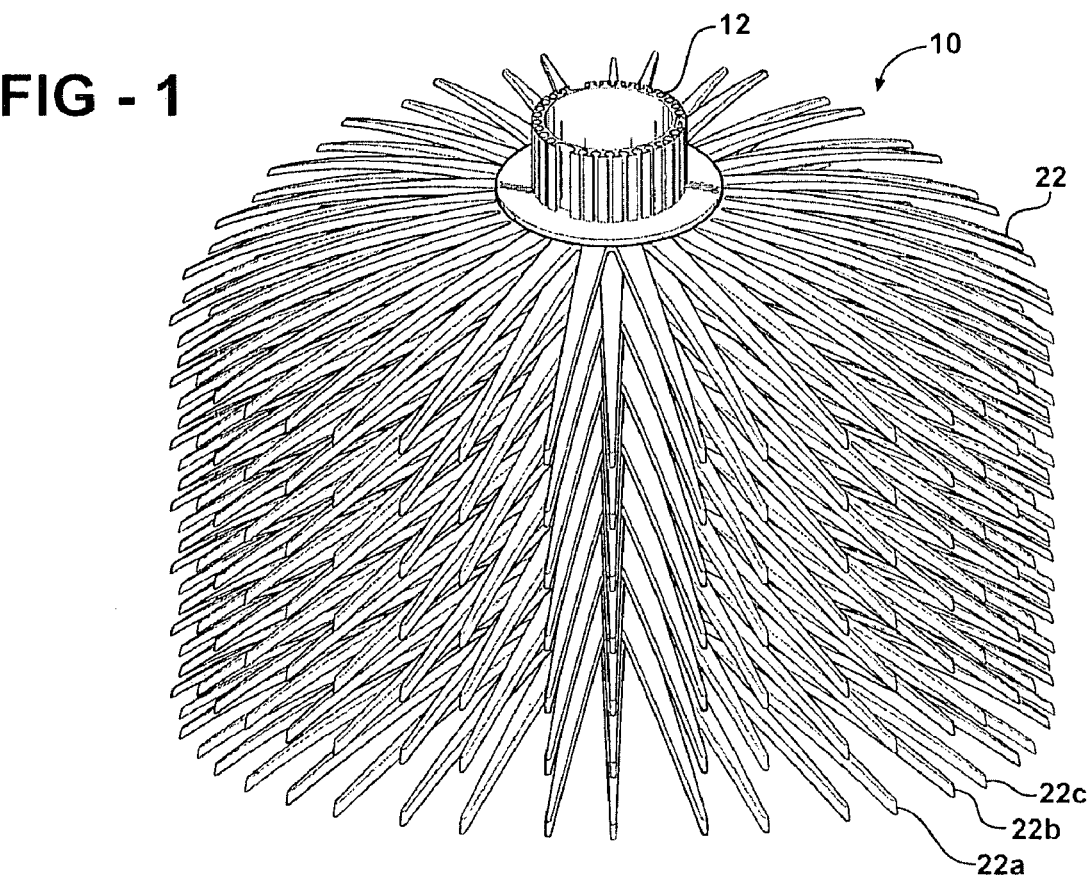
FIG. 1 shows in perspective a brush constructed in accordance with the invention.

FIGS. 1-4 illustrate a rotary car wash brush 10 for installation in a car wash. The brush 10 includes a hub 12 and at least one prefabricated brush cartridge 20 including at least one brush element 22 having radially extending flexible brush fingers or strands 22a, 22b, 22c, etc.

Figure 2:
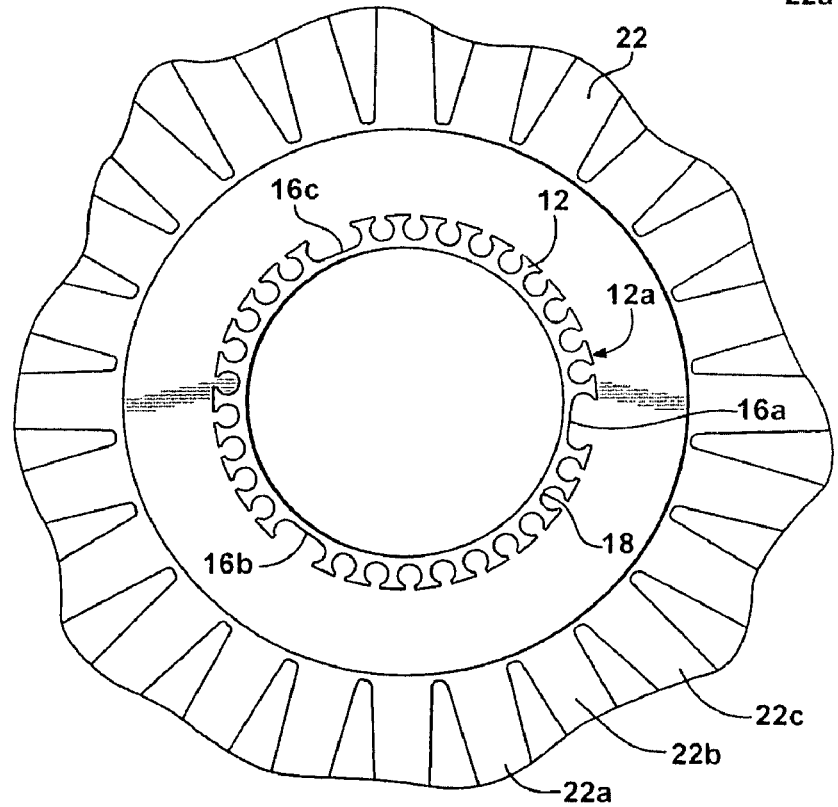
FIG. 2 is an end view of the brush of FIG. 1 showing the new keyways in the hub.

As best illustrated in FIG. 2, the hub 12 is formed by retrofitting a conventional hub having an outer circumferential surface 12a that defines a plurality of circumferentially spaced-apart longitudinal grooves 18, such as disclosed in U.S. Pat. No. 4,018,014. The hub 12 shown has been altered by machining three longitudinally extending keyways or channels 16a, 16b and 16c spaced at 120° intervals around the circumference of the hub 12.

Each keyway 16a, 16b and 16c has the same cross-sectional shape so tie brush cartridges 20 can be installed in any of three orientations, and each cross-sectional shape is substantially constant so the brush cartridges 20 can slide the length the hub 12. Conventional hubs are typically formed from steel, so the channels 16a, 16b and 16c can be machined into the hub 12 by milling, for example. Fewer or greater than three channels 16a, 16b and 16c can be used.

Figure 3:
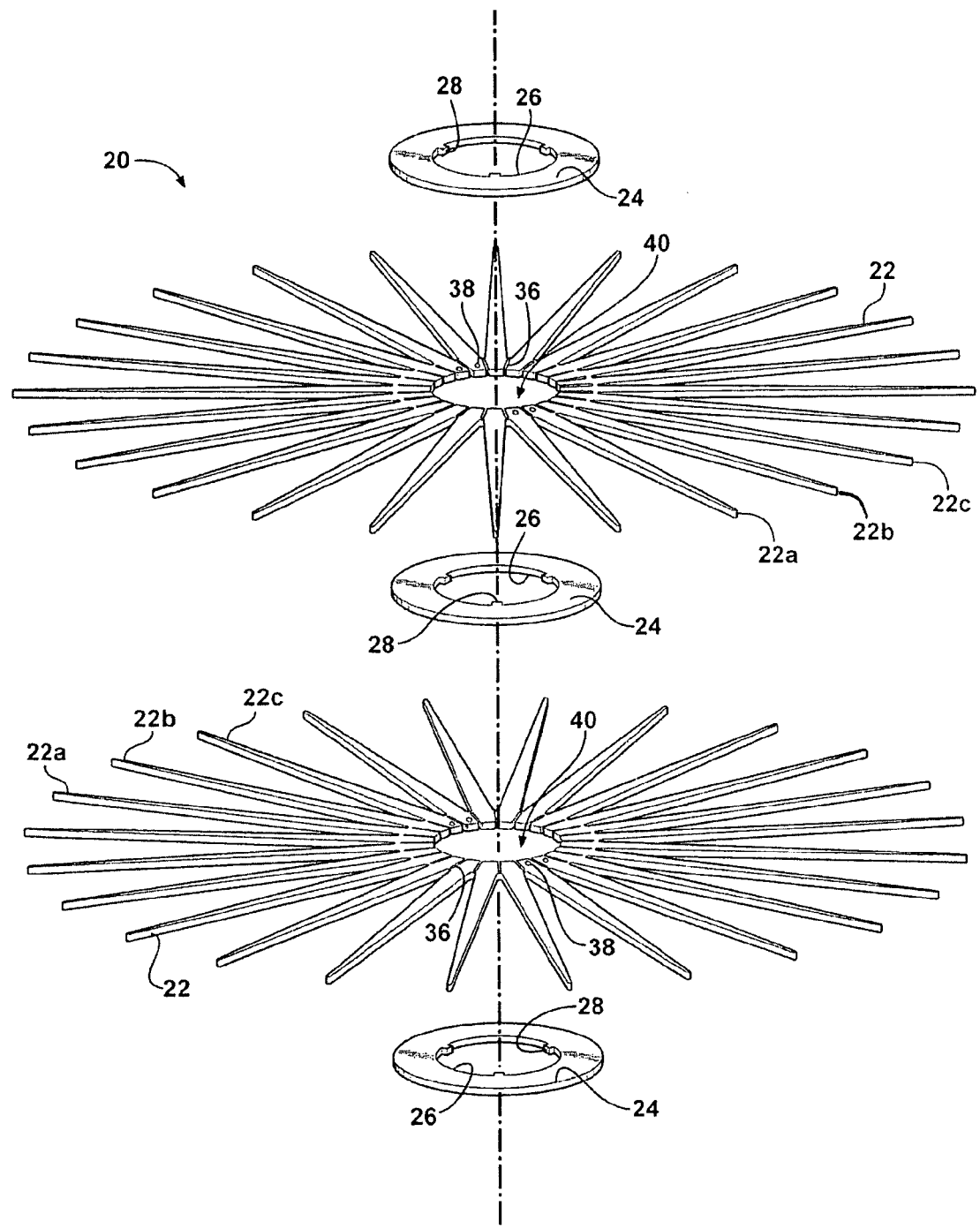
FIG. 3 is an exploded view of the brush of FIG. 1.

The brush 10 includes at least one prefabricated, wheel-shaped brush cartridge 20 arranged on hub 12 in longitudinally stacked relation. FIG. 3 illustrates an exploded view of a cartridge 20. Each cartridge 20 includes at least one radially extending brush element 22 and at least one spacer 24 alternately layered, with a spacer 24 on each end of the cartridge.

The brush elements 22 are radially extending sheets of material for contacting and washing a vehicle passing through the car wash. The brush elements 22 include a plurality of approximately one inch wide radially projecting fingers 22a, 22b, 22c, etc. circumscribing a center hole 40. The brush elements 22 are formed from a non-woven fabric-like material such as foam plastic. The foam plastic is preferably a medium or low density, e.g., approximately 3½ pounds per cubic foot, closed cell polyethylene foam. The thickness of the star-shaped brush elements 22 as illustrated is approximately ¼ inch.

Figure 4:
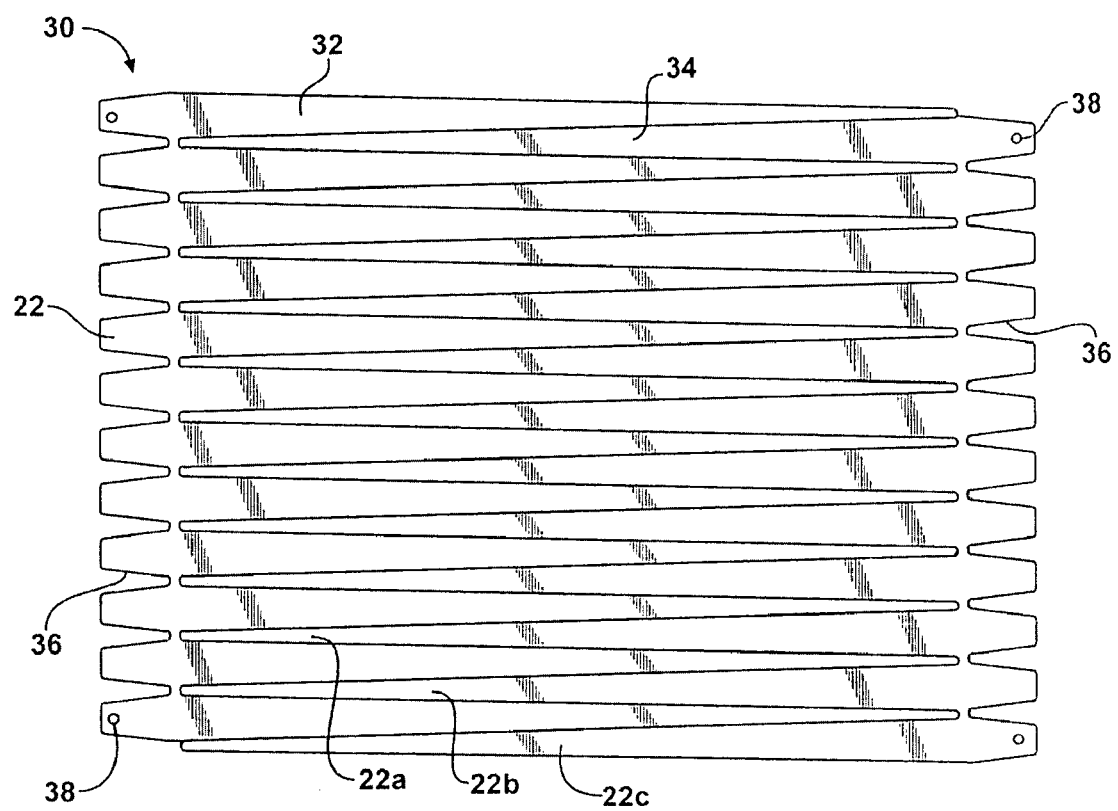
FIG. 4 is a pattern in which the brush elements are formed from sheets of fabric.

FIG. 4. illustrates a preferred blank 30 for die cutting material to form the brush elements 22. Each brush element 22 is formed by bending and combining two halves 32 and 34. Each brush element can be made from a single, integrated piece of material or, alternatively, in several pieces which are joined together. In the blank 30, the fingers 22a, 22b, 22c, etc. of each half 32, 34 are interlocked so the brush element 22 can be formed with a minimal amount of material. Notches 36 and apertures 38 are formed on the sides of the halves 32, 34 that the form inner radial side of a brush element 22 when the brush cartridge 20 is assembled.

Referring back to FIG. 3, the spacers 24 are annular, and each spacer 24 forms an aperture 26 with three uniformly spaced, inwardly projecting keys 28 shaped and sized to fit into the keyways 16a, 16b and 16c of the hub 12. The spacers 24 can be formed from foam plastic, though the foam plastic from which the spacers 24 are made is preferably more dense than the foam plastic of the brush elements 22. The thickness of the spacers 24 as illustrated is approximately ¼ inch.

To form a cartridge 20, the brush element halves 32 and 34 are installed in a fixture (not shown) having pins that penetrate the apertures 38. The fixture bends the halves 32 and 34 from the straight arrangements illustrated in FIG. 4 to the star-shaped arrangements illustrated in FIG. 3 to form the brush element 22 about the center hole 40; the notches 36 prevent the brush element 22 from bunching up when bent. The aperture 26 of a spacer 24 is aligned with the center hole 40 of the brush element 22 so the two will fit easily over the end of the hub 12, and the spacer 24 is adhered to the brush element 22 with a hot melt adhesive.

Additional brush elements 22 and spacers 24 having keys 28 circumferentially aligned are similarly stacked and adhered to form the layers comprising the prefabricated brush cartridge 20 (prefabricated meaning the layers of cartridge 20 are adhered to each other prior to insertion onto the hub 12). Although only one spacer 24 per cartridge 20 is required, spacers 24 can be adhered to both sides of each cartridge 20 if greater structural strength is desired.

Preferably, each individual cartridge 20 includes multiple layers of brush elements 22 and spacers 24 resulting in a cartridge 20 thickness of six to eight inches. A spacer 24 is preferably used at each outside surface. The six to eight inch thickness balances ease of assembly by keeping the number of cartridges 20 installed on the hub 12 relatively low with versatility by permitting the cartridges 20 to be used on a variety of lengths of hubs 12

To assemble the brush 10, the key 28 of each cartridge 20 is aligned with the keyway 16 of the hub 12. Aligned cartridges 20 are slidably engaged with the hub 12. Multiple cartridges 20 are installed until the desired brush length is achieved. Any length of the hub 12 remaining unoccupied after the desired number of cartridges 20 have been installed can be filled with spacers 24. The coupling of the keyways 16 and the keys 28 prevents rotation of the cartridges 20 relative to the hub 12. The brush 10 is then installed in a pivot bracket with bearings to allow rotation of the hub 12 and a motor to provide rotational drive.

Constructing or reconstructing the brush 10 from cartridges 20 is simple and fast. Further, while conventional brush elements have a fixed length, the length of the brush 10 made up of multiple cartridges 20 can be modified by adding or subtracting cartridges 20 due to the prefabricated nature of the brush 10. Thus, the brush 10 can be used on different length hubs 12 to form, as examples, an eight foot long top brush or a six foot long side brush. Moreover, the use of foam plastic for the brush elements 22 and spacers 24 reduces the weight of the brush 10. Finally, retrofitting an existing hub reduces the cost of the brush 10. While the invention permits salvaging an existing "old fashioned" hub 12, a new hub which does not have the unused grooves 18 can also be used in totally new installations.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A rotary car wash brush comprising:
    an elongate, substantially cylindrical hub having an outer circumferential surface and at least one longitudinally extending keyway formed in said surface; and
    a plurality of longitudinally stacked, prefabricated annular brush cartridges each having a central aperture and disposed on the hub and having a key fit into said keyway to prevent relative rotation between the hub and cartridge but to allow longitudinal sliding motion of the cartridges along said hub for purposes of installation, each brush cartridge including alternately stacked layers of flexible brush elements and annular spacers, each element being made of a flexible sheet material and defining a plurality of circumferentially spaced, radially extending fingers joined together at their inner ends and adhesively bonded to the interleaved spacers, each spacer having a central opening and at least one radially inwardly projecting key to fit into said keyway;
    whereby each cartridge is a unitary assembly adapted to be individually slidingly mounted on said hub.

2. The rotary car wash brush of claim 1, wherein the elements and spacers are made of plastic foam and wherein the density of the plastic foam spacers is greater than the density of the plastic foam elements.

3. The rotary car wash brush of claim 2, wherein the foam plastic of the elements is a closed-cell foam plastic having a density of about 2 to 5 pounds per cubic foot.

4. The rotary car wash brush of claim 1, wherein each cartridge has a longitudinal dimension of between about 6 to 8 inches.

5. The rotary car wash brush of claim 1, wherein the outer circumferential surface includes a plurality of circumferentially spaced longitudinal grooves, and wherein the at least one longitudinally extending keyway is retrofittingly formed in the outer circumferential surface.

6. The rotary car wash brush of claim 1, wherein the outer circumferential surface includes a plurality of circumferentially spaced longitudinal grooves, and wherein the at least one longitudinally extending keyway is formed circumferentially between two of the grooves.

\* \* \* \* \*